Figure 1:
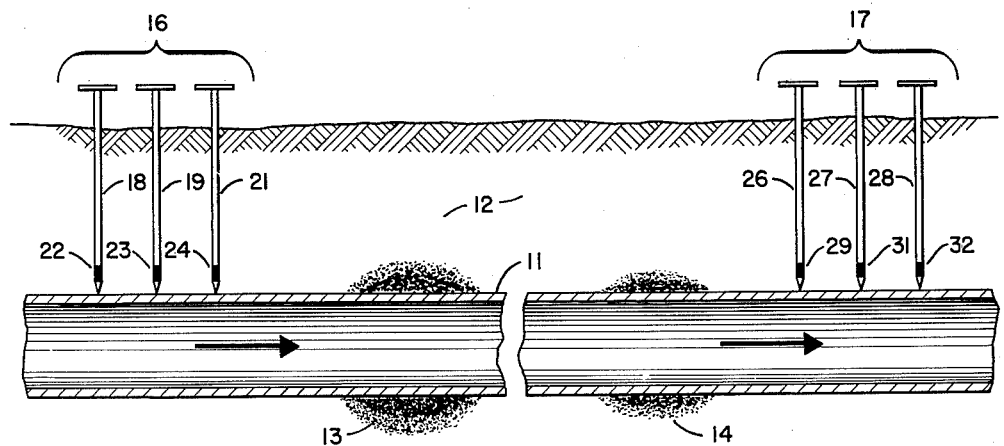

Aug. 21, 1962 P. L. GANT ET AL 3,050,629
LOCATION OF PIPELINE LEAKS
Filed April 9, 1959 2 Sheets-Sheet 1

INVENTORS
PRESTON L. GANT
JOHN D. SUDBURY
BY *Joseph C. Kotarski*
ATTORNEY

Aug. 21, 1962 P. L. GANT ET AL 3,050,629
LOCATION OF PIPELINE LEAKS
Filed April 9, 1959 2 Sheets-Sheet 2

INVENTORS
PRESTON L. GANT
JOHN D. SUDBURY
BY Joseph C. Kotarski
ATTORNEY

United States Patent Office 3,050,629
Patented Aug. 21, 1962

3,050,629
LOCATION OF PIPELINE LEAKS
Preston L. Gant and John D. Sudbury, Ponca City, Okla., assignors to Continental Oil Company, Ponca City, Okla., a corporation of Delaware
Filed Apr. 9, 1959, Ser. No. 805,283
4 Claims. (Cl. 250—106)

This invention relates to improvements in locating leaks in pipelines, and particularly concerns a method employing radioactive material.

The detection and location of leaks in pipelines require improvement in several respects. The location of leaks must be determined more accurately. Also, the determination of the size of the leak requires improvement with respect to accuracy. Some technique must be provided whereby the leak can still be detected and sized accurately even though there is a minor malfunctioning of the detection equipment. The above are some of the objectives and problems toward which the present invention is directed. Other objects and advantages will be more apparent from the detailed description of the invention.

In accordance with the present invention, pipeline leaks, for example, those such as underground pipelines carrying a petroleum oil, can be located geographically and the size of the leak determined with precision. This is done by positioning at each of a number of geographically known locations along the length of the pipeline a grouping of at least two (or even three or more) gamma ray emitting radioactive markers. The plurality of markers are placed in close proximity to each other. Each of the markers carries radioactive material which is placed adjacent the pipeline. A fluid is flowed through the pipeline, for example, a petroleum oil or any of the various liquid petroleum products, chemicals, water, etc, dilute liquid solution of gamma ray emitting radioactive material is then injected into the pipeline. A slug of radioactive liquid is thereby formed and passes through the line. As this radioactive slug passes by holes in the line, a portion of the slug leaks through the holes and forms zones of radioactivity in the ground adjacent the exterior of the line and close to the holes. The level of radioactivity exterior of the pipeline and near the hole will be proportional to the size of the leak in the pipeline. After passage of the radioactive slug, additional amounts of liquid are passed through the line to flush away any radioactive material clinging to the interior thereof. A radioactivity detecting and recording apparatus, which may suitably be attached to a pipeline pig, is then introduced into and passed through the pipeline. The radioactivity detection and recording means travels through the pipeline along the same path traveled by radioactive solution and passes by the various groupings of markers, which may be from one to ten miles apart. The detecting and recording of the radioactivity emitted by the markers in each of the groupings and likewise the radioactivity emitted by the radioactive slug which has leaked through the holes in the line are recorded in a manner which is related to, or relatable to, the distance along the pipeline. Inasmuch as each group of radioactive markers will exhibit a rather unique set of radioactive signals and resultant recording, the recordation of the geographically located markers cannot be confused with the recording of a leak or leaks in the line. Since the location of the markers is geographically known, the radioactivity due to leaks between groupings of markers can be determined.

By employing radioactivity detecting and recording means which will provide a record of the level of radioactivity exterior of the pipeline, the size of the leaks can be gauged or determined inasmuch as they will be proportional to the level of radioactivity emitted by the portion of the radioactive slug which has leaked through the hole. In conjunction with the use of such equipment, it is preferable to employ radioactive markers which emit a known level of radioactivity. The detecting and recording instrument will then produce a record on which the radioactivity emitted by the groupings of markers can be readily recognized and distinguished from leaks since they will conform to a previously known pattern and level of radioactivity. When the recorded radioactivity of the markers in a grouping differs from the recording to be expected from the markers, this indicates a malfunctioning of the equipment. This difference or variation can be used in correcting the recorded size of leaks to the correct leak sizes. In this respect the groupings of markers can be used as means for recalibrating the recorded levels of radioactivity to indicate correct leak size whenever there is a malfunctioning of the instrument in this regard.

Figure 2:
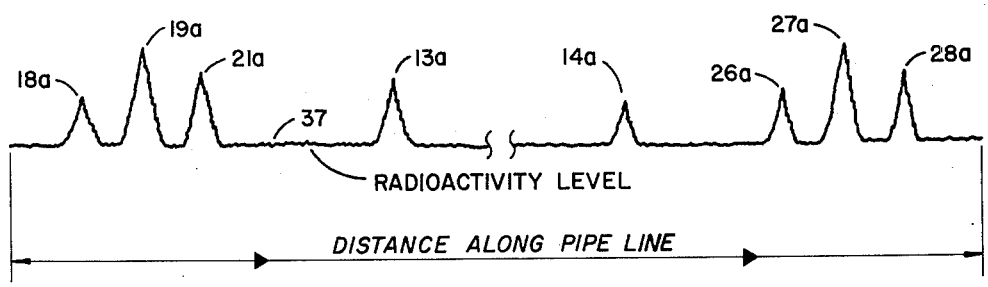
Figure 3:
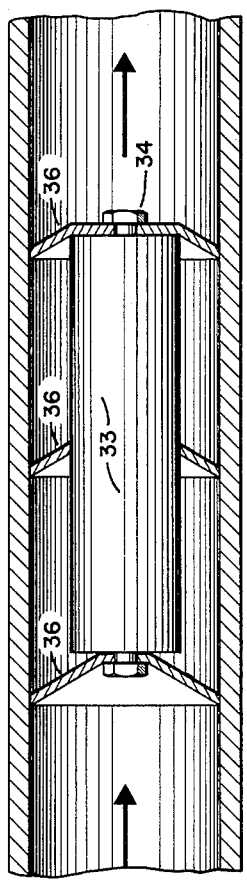
Figure 4:
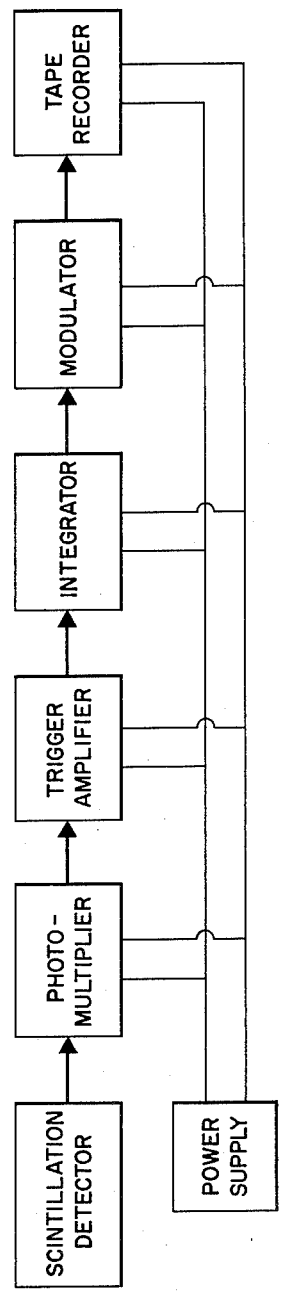

FIGURES 1 through 4, which form a part of the present specification, illustrate various features of an embodiment of the invention. FIGURE 1 shows in schematic cross-section two groupings of radioactive markers positioned adjacent a pipeline having leaks. FIGURE 2 schematically shows a record of the detected levels of radioactivity from the radioactive marker groupings and leaks illustrated in FIGURE 1. FIGURE 3 shows in partial cross-section a schematic diagram of a pipeline in which is present a detection and recording instrument useful in the practice of the invention. FIGURE 4 illustrates in schematic form various elements which may be employed in the detection and recording apparatus.

Referring now to FIGURE 1, pipeline 11 which is buried in ground 12 has leaks 13 and 14 of unknown size and location. To assist in locating and sizing the leaks, a series of radioactive marker groupings, illustrated by 16 and 17, are placed near pipeline 11. Each grouping is spaced about ½ to 10 miles from the next grouping, the closer the spacing the greater is the accuracy in locating the leak. The marker groupings are placed in geographically known locations along the line, for example, near road crossings, bridges, surveyed points on the line, etc.

Each grouping is composed of a plurality of radioactive markers. Long spikes or probes 18, 19 and 21, which have radioactive sources 22, 23 and 24 respectively near their lower ends, are placed in the ground so that their pointed ends touch or are very close to the pipeline. Likewise, spikes 26, 27 and 28 which compose marker grouping 17, have radioactive sources 29, 31 and 32 respectively. The radioactive spikes or markers are placed about 2 to 20 feet from each other, in geographically known positions. At least two markers are used in forming each grouping and as many as 3 to 6 or more may be employed toward the objective of receiving a set of radioactive signals from the markers which is sufficiently unique so that it is not confused with leaks in line. The individual markers in each grouping are equidistant from each other or in some other spatial arrangement which is repeated within all of the other groupings. This facilitates interpretation of the record. The radioactivity source in each of the markers emits gamma rays. It may be cobalt-60, iron-59, cesium-137, or the like, which emit from 1 to 25 microcuries. The radio active source may have higher intensity, but above 100-200 microcuries a safety hazard exists in handling the many radioactive markers which are set out along the line. Each of the radioactive sources on the ends of the tines may exhibit the same radioactivity level, but it is preferred to employ sources having different levels of radioactivity for each of the markers in a given grouping. Thus, radioactive source 22 may emit 10 microcuries, radioactive source 23 may exhibit 25 microcuries, and radioactive source 24 may exhibit 15 microcuries. This pattern of radioactivity exhibited by marker grouping 16 is repeated every ½ to 20 miles along the pipeline. A slotted source of radioactivity (in which the radioactive source is sealed on all sides except for a narrow slit facing the pipeline) may be used as a radioactive marker if desired.

To illustrate the operation of the present invention, reference is made to FIGURE 3. In this figure there is shown pipeline 11 through which is flowing gasoline, although the invention may be practiced with other liquids, such as other petroleum products, crude oil, chemicals, and even water. Radioactive material which is soluble in the liquid flowing in the line is made in a preformed dilute solution. The liquid used in making the preformed solution is preferably the same liquid as is flowing through the pipeline. It is preferred to use radioactive material which has a short half life. For example, derivatives of iodine-131 (which has a half life of 8 days), bromine-82 (which has a half life of 36 hours), or other short half-life elements may be used. The radioactive material is contained in a very low concentration in the liquid injected into the pipeline, e.g., on the order of .01 to 1 percent. For example, to a pipeline in which gasoline is flowing there may be injected a solution of approximately 0.1 to 10 grams of radioactive dibromobenzene or ethylene bromide in approximately 0.5 to 5 kilograms of gasoline. The radioactive organic bromine compound itself has a specific activity on the order of 200 millicuries per gram. When higher specific activity radioisotopes are used, the weight thereof may be proportionately less, in light of the above example, and when using lower specific activity radioisotopes the weight must be proportionately greater. This solution of radioactive material is rapidly injected into the flowing gasoline in the line and forms a radioactive slug, i.e., flowing section of radioactive gasoline, in the pipeline. This radioactive slug flows in the line and portions of it leak through holes in the line and saturate the ground adjacent the holes. Gasoline is thereafter allowed to flow in the pipeline past the point of injection for approximately fifteen minutes to two hours to flush the interior surface of the line free of radioactive material.

A pipeline pig such as is schematically illustrated in FIGURE 3 is then inserted into the line. This pipeline pig consists of an instrument carrier 33, whose components are further illustrated in FIGURE 4. The instrument carrier is attached to pipeline pig 34. Cups 36 form a part of pig 34. The cups are made from a tough, flexible material resistant to gasoline. They are circular in shape and present a concave surface to the gasoline flowing in the pipeline. The circumference of the cup rides along the walls of the pipeline and acts in a sense as a seal so that the gasoline flowing in the pipeline propels the pipeline pig with its attached instrument carrier through the line at nearly the same rate as the flowing gasoline. Some slippage occurs, the pipeline does not always follow a horizontal path, and therefore the location of the leak cannot be determined with any degree of accuracy by trying to relate elapsed time until the location of the leak with rate of gasoline flow. The subject invention improves greatly the accuracy in locating leaks. These cups keep the instrument carrier 33 located near the central axis of the pipeline. Three cups are provided so that the pipeline pig and associated instrument carrier will bridge over any valve holes in the pipeline without becoming stuck in the line. Rather than using the cups illustrated in FIGURE 3 the pig may have extending radially from its center a plurality of projecting rods to which are attached rubber bumpers or wheels. The instrument carrier itself is cylindrical in shape and made to withstand usual pipeline pressures, e.g., on the order of 50–2500 p.s.i.g.

FIGURE 4 is a schematic representation of the detection and recording equipment carrier contained inside instrument carrier 33. The scintillation detector (or other suitable means for detecting the external radioactivity) detects the gamma rays emanating from the leaked radioactive material outside the line. The gamma rays impinging upon a sodium iodide crystal detector are converted to flashes of light. The light is reflected into a photomultiplier where it is converted to a direct current of varying magnitude and amplified. The magnitude of the current produced therefrom is proportional to the level of radioactivity in the area detected by the scintillation detector. A trigger amplifier and integrating means are associated with the photomultiplier to provide an indication of the average current for a fixed unit of time, this average current being proportional to the radioactivity detected. This current is then manifested as an E.M.F. by suitable means, i.e., flowing current through a fixed resistor causes an E.M.F. to develop according to the law $E = IR$. The E.M.F. is then modulated onto a carrier frequency which is an integral part of a tape or wire recorder. The results are permanently recorded by conventional means on the tape or wire reel. The recorder is operated at a constant speed, since the pipeline pig will pass through the line at an approximately constant rate which is relatable to the steady flow rate of the gasoline. Thus, indications of radioactivity outside the pipeline will be recorded in terms of distance along the pipeline with crude accuracy. After completion of the pipeline test, the pipeline pig is removed from the line and the recording recovered from the instrument carrier. It can then be played back and used to provide a visual record showing radioactivity levels at various points along the length of the pipeline.

Such a record is shown in FIGURE 2. Radioactivity is plotted against distance along the line. The recorded radioactivity along the outside of the pipeline is shown as trace 37. The various peaks in the trace correspond to the places of exterior radioactivity shown in FIGURE 1. Thus peak 18a is a measure of radioactivity emitted by marker 18, peak 19a is a measurement record of radioactivity emitted by marker 19a, peak 13a corresponds with leak 13, peak 14a with leak 14, and so on. Since the radioactive sources in markers 18, 19 and 21 emit 10, 25 and 15 microcuries respectively, the record pattern shown by peaks 18a, 19a and 21a, which are also spaced by the same distances from each other as are known to exist for the markers, must correspond to the markers 18, 19 and 21. The chances are just too remote that leaks of the proper size and distances apart would occur and be confused with the markers. On the other hand, if only one marker were used as in British 774,136, it could easily be confused with leaks 13 or 14 (note the peaks 13a and 14a on trace 37). Because the geographic locations of marker groupings 16 and 17 are known, the distances between the marker groupings and the leaks on the record will be proportional to actual ground distances and can be used to provide an accurate geographic location of the leaks. The variation in rate of travel of the detecting and recording instrument in the pipeline can be greatly eliminated as a factor bearing on the accuracy of location of the leak. By locating the marker groupings at points where the pipeline changes direction (with respect to the horizontal) from its previous direction, the distances on the record from the marker groupings to the leaks will be an even more accurate measurement of their geographic location.

The level of recorded radioactivity can be expressed in terms of leakage, e.g., gallons per hour, so that the size of the leak is immediately known from the record. Leak sizes as small as 0.2 gal./hr. can be located. When the detector and recording apparatus fails to function properly and it is noticed that the peaks corresponding to the markers are lower than usual, then it is also known that the record should be recalibrated proportionately in order to provide the correct leak size. For example, if the recorded level of the markers drops to one-half their former height then the subsequently recorded leaks should be twice the size indicated by the calibration of the normally functioning apparatus. This permits locating and sizing leaks even when the apparatus is not functioning properly. If the detecting and recording apparatus fails completely, then it is known that the leak test was completed at least until the last recorded marker grouping and thus the entire pipeline need not be retested.

While only certain embodiments of the invention have been described herein, other equivalent modifications thereof will be apparent to those skilled in the art.

Thus having described the invention, what is claimed is:

1. A method for detecting and locating leaks in a pipeline which comprises positioning at each of a number of geographically known locations along the length of said pipeline a series of groupings of radioactive markers, the groupings being spaced a considerable distance from each other and each grouping consisting of at least two gamma ray emitting radioactive markers, said markers in each grouping being in close proximity to each other and adjacent the pipeline at each of said geographically known locations, flowing liquid through said pipeline, injecting into said pipeline a dilute liquid solution of radioactive material, flowing said solution of radioactive material through said pipeline whereby portions of said radioactive solution leak into the ground adjacent the pipeline by passage through leak holes in the line, flowing additional amounts of liquid behind the radioactive solution to flush radioactive material from the interior surface of the pipeline, introducing and passing a radioactivity detection and recording means through the pipeline along the path traveled by the radioactive solution and past groupings of markers, detecting and recording in a manner relatable to distance along the pipeline any radioactivity exterior of the pipeline which is emitted by the leaked solution and by the groupings of markers of known radioactivity emitting level whereby recorded radioactivity exterior of the pipeline due to the presence of leaks can be distinguished from recorded radio activity exterior of the pipeline due to the radioactive markers.

2. A method for detecting, locating, and sizing leaks in a pipeline which comprises positioning at each of a number of geographically known locations along the length of said pipeline a series of groupings of radioactive markers, the groupings being spaced a considerable distance from each other and each grouping consisting of at least two gamma ray emitting radioactive markers emitting known levels of radioactivity, said markers in each grouping being in close proximity to each other and adjacent the pipeline at each of said geographically known locations, flowing liquid through said pipeline, injecting into said pipeline a dilute liquid solution of radioactive material, flowing said solution of radioactive material through said pipeline whereby portions of said radioactive solution leak into the ground adjacent the pipeline by passage through leak holes in the line, flowing additional amounts of liquid behind the radioactive solution to flush radioactive material from the interior surface of the pipeline, introducing and passing a radioactivity detection and recording means through the pipeline along the path traveled by the radioactive solution and past groupings of markers, detecting and recording in a manner relatable to distance along the pipeline the levels of radioactivity exterior of the pipeline which are emitted by the leaked solution and by the groupings of radioactive markers, the recorded radioactivity due to leaks being recorded in a manner relatable to the size of the leak, whereby recorded radioactivity due to detected leaks is not confused with recorded radioactivity due to detected markers, and the size of leaks between groupings of markers can be determined and the recorded size of leaks corrected by any variation from normal of the recorded level of radioactivity emitted by a marker.

3. The method of claim 2 wherein the markers in a given grouping emit different levels of radioactivity.

4. The method of claim 2 wherein the marker groupings are located at points along the pipeline where the pipeline changes direction, with respect to the horizontal, from its previous direction.

References Cited in the file of this patent

UNITED STATES PATENTS

| 2,228,623 | Ennis | Jan. 14, 1941 |
| 2,540,049 | Hinson | Jan. 30, 1951 |
| 2,588,210 | Crisman | Mar. 4, 1952 |

OTHER REFERENCES

Application of Radioisotopes to Leakage and Hydraulic Problems, by Putman et al., from Proceedings of International Conference on Peaceful Uses of Atomic Energy, vol. 15, pages 147–150, United Nations Publications, New York, 1956.